United States Patent [19]

Pilarczyk

[11] 4,028,888

[45] June 14, 1977

[54] FUEL DISTRIBUTION MANIFOLD TO AN ANNULAR COMBUSTION CHAMBER

[75] Inventor: Karol Pilarczyk, Loudonville, N.Y.

[73] Assignee: Norwalk-Turbo Inc., Latham, N.Y.

[22] Filed: Apr. 25, 1975

[21] Appl. No.: 571,791

Related U.S. Application Data

[62] Division of Ser. No. 466,877, May 3, 1974.

[52] U.S. Cl. .............................. 60/39.32; 60/39.36; 60/39.74 R; 239/550; 285/32; 285/89; 285/224

[51] Int. Cl.² .......................................... F02C 7/22

[58] Field of Search ............. 60/261, 39.31, 39.32, 60/39.74 R, 39.36, 39.37; 239/550, 551; 285/31, 32, 89, 33, 224

[56] References Cited

UNITED STATES PATENTS

| 691,246 | 1/1902 | Cram | 285/31 |
| 2,344,698 | 3/1944 | Howe | 285/32 |
| 2,359,846 | 10/1944 | Hayman | 285/32 |
| 2,672,727 | 3/1954 | Brown | 60/261 |
| 2,690,648 | 10/1954 | Pearce et al. | 60/39.74 R |
| 2,795,106 | 6/1957 | Martin | 60/39.74 R |
| 2,970,438 | 2/1961 | Howald | 60/39.74 R |

FOREIGN PATENTS OR APPLICATIONS 878,928  10/1961  United Kingdom .......... 60/39.74 R Primary Examiner—Carlton R. Croyle
Assistant Examiner—Robert E. Garrett
Attorney, Agent, or Firm—Bryan & Bollo

[57] ABSTRACT

A fuel distribution system for a gas turbine-compressor includes means permitting ready replacement and maintenance of individual fuel nozzles without disassembly of the entire fuel nozzle system. The gas turbine-compressor finds particularly useful application in areas where high power, compact, relatively maintenance-free units are required, as, for example, on offshore platforms in the natural gas industry.

3 Claims, 3 Drawing Figures

FUEL DISTRIBUTION MANIFOLD TO AN ANNULAR COMBUSTION CHAMBER

BACKGROUND OF THE INVENTION

This application is a division of an application Ser. No. 466,877, filed May 3, 1974 and made pursuant to a requirement of restriction.

This invention relates to high speed centrifugal compressors and more particularly to a high speed centrifugal compressor driven by a gas turbine. Centrifugal compressors find applications in various fields and increasing utility in the expanding natural gas industry for such services gas gathering, boosting, transmission, repressuring and distribution, and the like. In the gas boosting area particularly, there is a need for high speed centrifugal compressors which will operate relatively maintenance free, are compact for ease of transportation and installation on site and which are driven by prime movers which use readily available energy sources. Thus, it would be desirable in the natural gas industry, as well as in the process industry, to have available a high-speed compressor which together with its prime mover provides compact, efficient, comparatively maintenance free operation.

SUMMARY OF THE INVENTION

According to this invention, a centrifugal compressor having a single stage or a plurality of stages may be driven by a gas turbine engine having a power shaft rotation of 33,000 rpm in a 650 nominal horse power engine with the result that natural gas compression at pressure ratios up to 6 to 1 may be obtained in a compact and efficient compressor-driver unit. The compactness and light weight of such a unit is exemplified by the fact that it takes up only 16 square feet of floor area and weighs approximately 3,400 pounds, making it readily trailer mounted for ease of transportation by light truck or by air lift to on site locations such as offshore platforms. Arranged in series, such units can compress gas from as low as atmospheric pressure to as high as 1500 psig. Used in parallel, large gas flows can be handled.

The gas generator section of the turbine engine of the compressor driver unit of this invention may be of the conventional type found in two-shaft gas turbine engines. While gas turbine engines generally burn aviation turbine fuels, gasoline, and diesel fuels, where the compressor is to be utilized in natural gas applications this invention advantageously provides a turbine combustion section which burns the natural gas available at the site. According to this invention, the gas is fed to the combustion chamber through a series of fuel nozzles located on a manifold which is positioned on the outside of the periphery of the combustion chamber. The fuel distribution manifold system of this invention permits ready access and removal of individual fuel nozzle elements for cleaning or replacement without the need for removing the entire manifold assembly. Accordingly, yet another object of this invention is the provision of a fuel nozzle manifold system for a turbine engine combustion chamber which permits ready maintenance and servicing of individual fuel nozzles without the need for special tools or removal of the entire manifold.

BRIEF DESCRIPTION OF THE DRAWINGS

The above objects, aspects and advantages of the invention as well as others will become more apparent from the following detailed description of a preferred embodiment of the invention as shown in the drawings herewith in which.

DETAILED DESCRIPTION OF THE DRAWINGS

Figure 1:
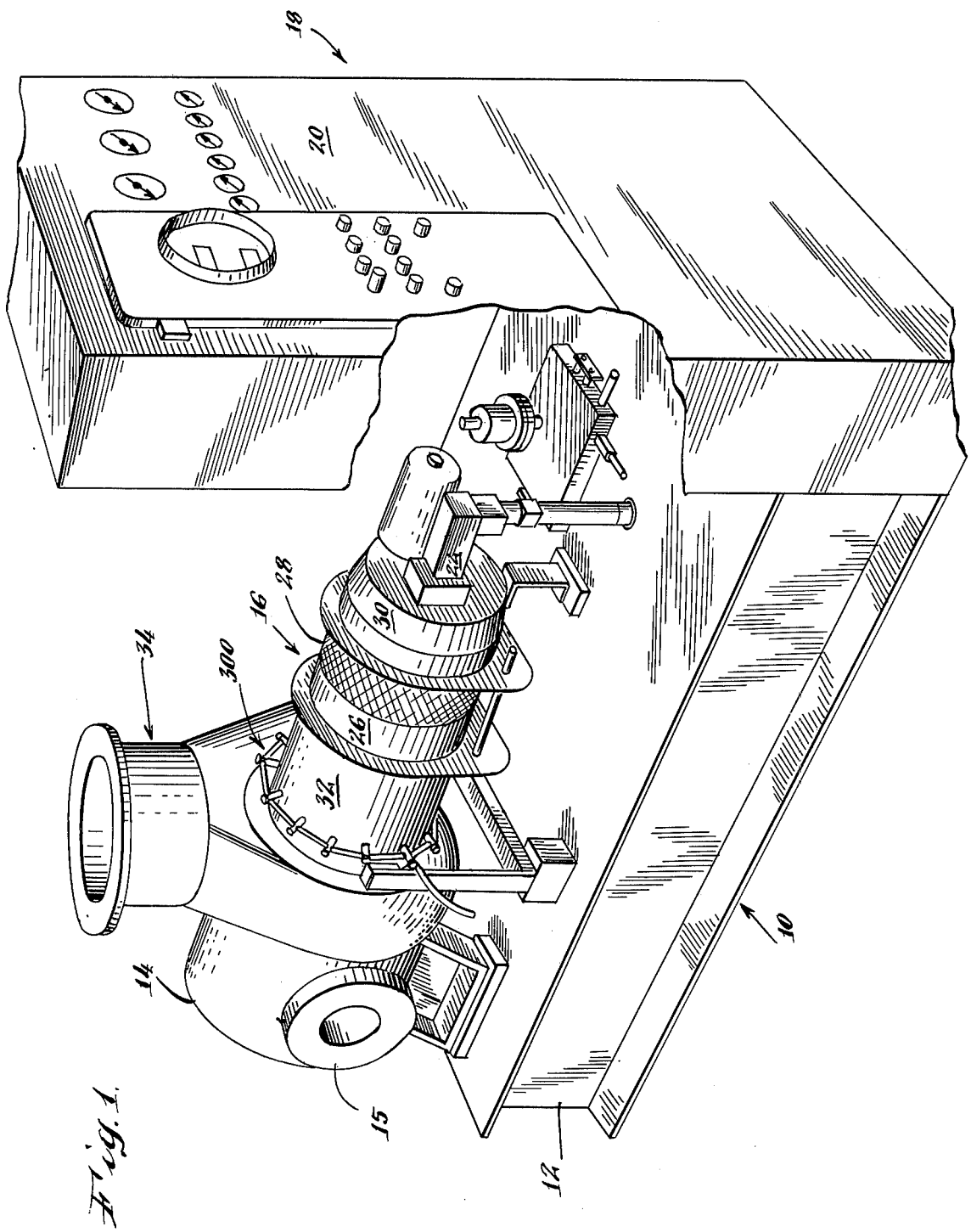
FIG. 1 is a perspective view of a complete compressor-gas turbine unit package incorporating the features of the present invention.

Referring to FIG. 1 there is shown a complete compressor-gas turbine unit package indicated generally at 10. The complete compressor-gas turbine unit package includes a rigid base plate 12 on which is mounted a centrifugal compressor 14, a gas turbine engine 16 and a control system 18 for continuous duty and fully automatic unattended operation. As shown generally on the control system panel 20, the control system may include means for indicating speed, pressure and temperature, as well as automatic starting, running and protective shut down controls.

The gas turbine engine 16 includes a gas generator section 26 having an annular screened air inlet 28. The gas generator section of the turbine engine also includes an accessory gear box 30. The combustion and power output section of the gas turbine engine is shown generally at 32 while the hot gas discharge exhaust is shown at 34. The fuel distribution manifold system of the present invention is generally shown at 300.

The gas generator section 26 of the gas turbine is of conventional design and may be of the type available from the United Aircraft of Canada Ltd., under the designation Pratt & Whitney ST6. The ST6 gas generator commercially available is a short compact unit which when coupled with a power output section can provide approximately 655 horse power with a power output shaft rotation as high as 33,000 rpm.

Figure 2:
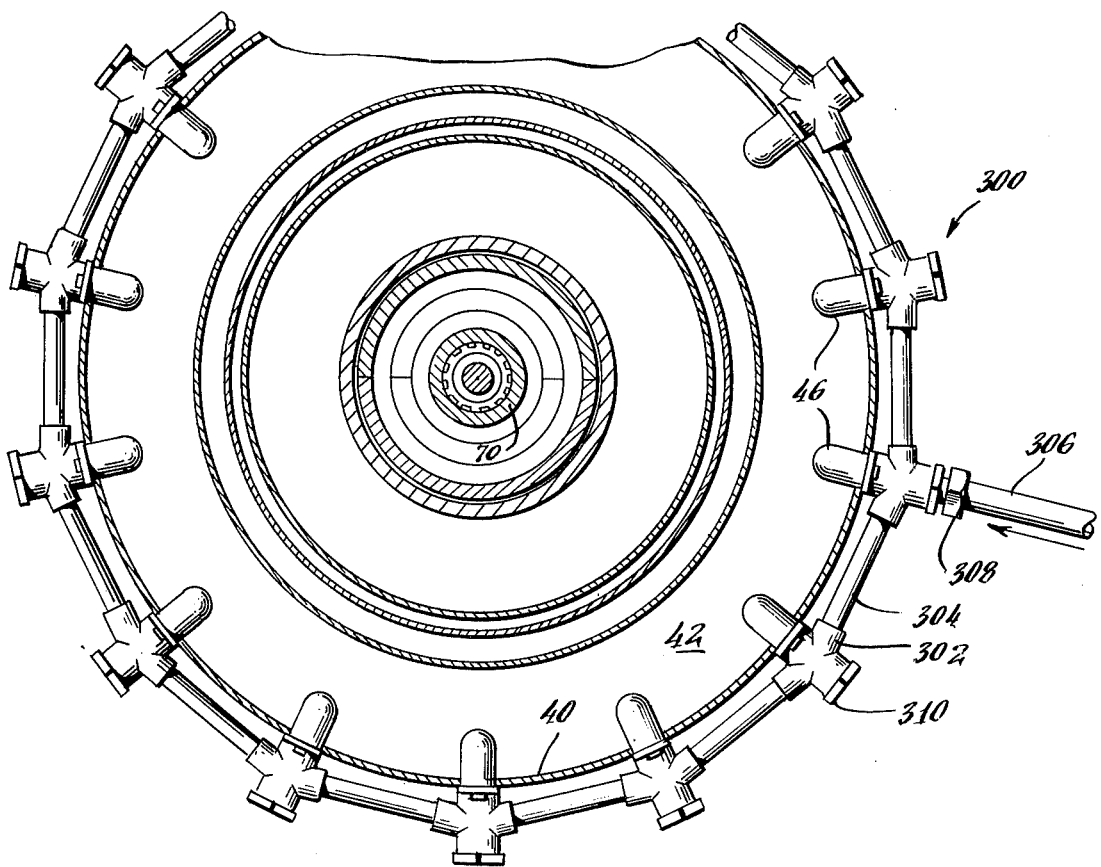
FIG. 2 is an enlarged sectional elevation view of the fuel distribution manifold system, through the gas turbine of FIG. 1.

FIG. 2 is an end elevational view, as a cross section through the gas turbine 16 (FIG. 1), looking along the periphery of the turbine outer wall barrel 40 and showing the fuel distribution manifold assembly, indicated generally at 300. The fuel injection manifold assembly includes a plurality of fuel nozzles 46 which extend into the combustion chamber 42 of the turbine engine. Combustion chamber perforated liner 44 is present but not shown here. Fuel nozzles 46 are connected by fuel distribution tubes 304 which extend about the periphery of the engine outer wall barrel 40 surrounding the combustion chamber. Gaseous or other fuel is fed to the manifold through fuel feed tubing or piping 306 joined to the assmebly 300 by means of a standard connector 308 to one or more nozzles 46. Although only one fuel feed location is shown in FIG. 2, it is to be understood that fuel may be fed generally in two of four locations and that the specific locations may be adjusted to satisfy the assembly requirements. The fuel nozzles 46 have fuel nozzle bodies 302 of one piece stainless steel cast construction which have been machined and bored. The end caps 310 seal the nozzle and are removable for access to the interior of a nozzle. The end caps 310 may also be modified to accept the standard gaseous fuel connection from a feed tube 306.

Figure 3:
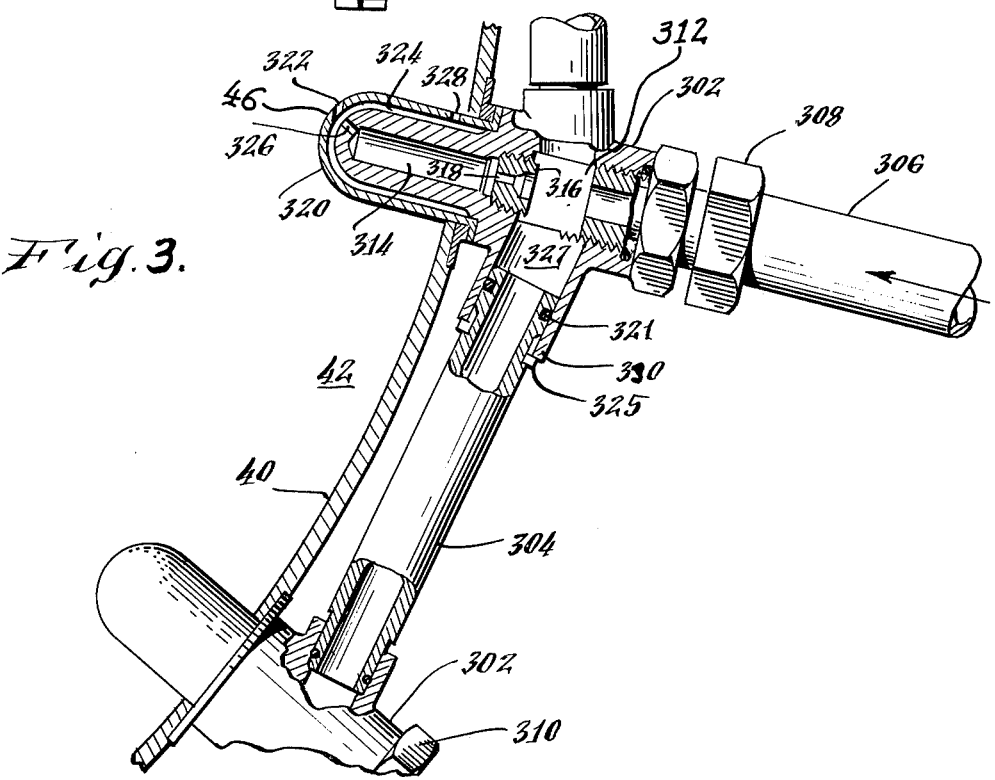
FIG. 3 is a partial cross-sectional view taken along a plane parallel to the paper showing, in enlarged detail, a fuel nozzle of the fuel distribution manifold system of FIG. 2.

FIG. 3 shows, in enlarged detail, a partial cross-sectional view of a fuel nozzle 46 of the assembly shown in FIG. 2 and having the connection with the gas feed tube 306. As can be seen in FIG. 3, the one piece cast fuel nozzle is machined to have fuel passageways 312 which cooperate with the fuel distribution tubes 304. Also machined into the fuel nozzle body 302 is a passageway by which the gaseous or other fuel may be conducted to the combustion chamber 42. This passageway is shown at 314 having an enlarged counterboard area in which is fitted a gaseous fuel metering plug 316. The gas metering plug 316 has a metering orifice opening 318 and is replaceable depending on the type of gaseous fuel used. The fuel nozzle body 302 is covered with a shield 320 which has an opening 322 which communicates with a chamber formed by the shield 320 and nozzle body 302 as shown at 324. The chamber receives fuel through the opening 326 as well as some air which may enter the chamber 324 through the opening 328. It will be understood by those skilled in the art that the metering plug and fuel feed holes are sized depending upon the gaseous fuel, be it butane, natural gas, liquid petroleum gas and the like, or other fuels used.

A feature of the fuel distribution manifold assembly of this invention is that each fuel nozzle 46 can be individually removed for maintenance or replacement if desired without removing other nozzles or substantially disturbing the manifold assembly. This is accomplished by removing the fuel distribution tube 304 which fits into the feed nozzle cylindrical collar flange 330 in slidable arrangement and forms a tight fit therein by means of the O-ring 321. The fuel distribution tube 304 is held in place through a snap ring 325. If it is desired to remove a nozzle, the operator need merely remove the snap ring 325 and slide the gas distribution tube within the nozzle flange 330, where a space is provided at 327, until the fuel distribution tube is free of the next adjacent nozzle 302. In this manner each individual nozzle may be readily removed without disturbing the remainder of the manifold assembly and without the need for special tools.

The fuel distribution manifold assembly and turbine power section modification have a general utility and direct coupling may be provided not only to compressors utilizing the invention of this application but also to other uses which require compact gas turbine driven machinery.

I claim:

1. A fuel distribution manifold system for feeding fuel to an annular combustion chamber of a gas turbine comprising an assembly of a plurality of individually removable fuel nozzles positioned about the periphery of the combustion chamber, fuel distributing tubes interconnecting the adjacent fuel nozzles for passage of fuel between the removable fuel nozzles, nozzle coupling means integrally formed with the nozzles for slidably receiving the ends of the fuel distributing tubes for sliding movement of the fuel distributing tubes along their longitudinal axes while the nozzles remain in position to permit the ready removal of any individual nozzle means in the assembly by disconnecting it from interconnection with adjacent nozzles without disturbing any other nozzle in the assembly, each nozzle coupling means including two oppositely disposed annular flange means to receive, in sliding arrangement, the ends of fuel distributing tubes, at least one of the annular flange means having sufficient length to allow sufficient sliding movement of the end of the tube received thereby so that the opposite end of the same tube disengages the annular flange means of an adjacent fuel nozzle, and means for feeding fuel to the assembly.

2. A fuel distribution manifold system as claimed in claim 1 wherein the two annular flange means of the nozzle coupling means include oppositely disposed collars in which are received, in sliding telescopic engagement, the ends of the fuel distributing tubes, at least one of the collars being of sufficient depth so that when the end of a tube is slid sufficiently therein its opposite end disengages the annular collar means of an adjacent fuel nozzle.

3. A fuel distribution manifold system as claimed in claim 1, wherein the fuel nozzles are capable of handling gaseous fuel and include means penetrating into the combustion chamber having a gas feed passageway therein for receiving gaseous fuel, the gas feed passageway communicating with a gas metering means, the gas metering means including a plug having an orifice therein, the plug being removably positioned in a cavity in each nozzle for communication with the gas feed passageway and with additional passageways within the nozzles which communicate with the fuel distributing tubes.

* * * * *